# (12) United States Patent
Harada

(10) Patent No.: US 12,017,604 B2
(45) Date of Patent: Jun. 25, 2024

(54) PEDESTRIAN PROTECTION AIRBAG DEVICE

(71) Applicant: Tomoaki Harada, Kanagawa (JP)

(72) Inventor: Tomoaki Harada, Kanagawa (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 18/042,860

(22) PCT Filed: Aug. 25, 2021

(86) PCT No.: PCT/JP2021/031141
§ 371 (c)(1),
(2) Date: Feb. 24, 2023

(87) PCT Pub. No.: WO2022/050145
PCT Pub. Date: Mar. 10, 2022

(65) Prior Publication Data
US 2023/0339425 A1  Oct. 26, 2023

(30) Foreign Application Priority Data

Sep. 1, 2020 (JP) ................................. 2020-146862

(51) Int. Cl.
*B60R 21/36* (2011.01)
(52) U.S. Cl.
CPC ................................. *B60R 21/36* (2013.01)
(58) Field of Classification Search
CPC .................................................... B60R 21/36
See application file for complete search history.

(56) References Cited

U.S. PATENT DOCUMENTS

| 2004/0041375 A1* | 3/2004 | Okamoto | B60R 21/36 |
| | | | 280/729 |
| 2013/0133971 A1* | 5/2013 | Rick | B60R 21/36 |
| | | | 180/274 |

(Continued)

FOREIGN PATENT DOCUMENTS

| DE | 10254589 A1 * | 6/2003 | ............. B60R 21/36 |
| JP | 7-156749 A | 8/1995 | |

(Continued)

OTHER PUBLICATIONS

Abele et al., Safety device used for protecting pedestrians comprises an air bag device, a gas generator and a sensor coordinated so that the gas generator blows different volumes of gas in the direction, Jun. 12, 2003, EPO, DE 10 254 589 A1, Machine Translation of Description (Year: 2003).*

(Continued)

*Primary Examiner* — James A English
(74) *Attorney, Agent, or Firm* — Harness, Dickey & Pierce, P.L.C.; Stephen T. Olson

(57) ABSTRACT

A pedestrian protecting airbag device having an airbag cushion that expands and deploys from below a front hood toward a windshield, and inflators and that supply gas to the airbag cushion. The airbag cushion includes a first deployment part that expands and deploys along the lower portion of the windshield, and a second deployment part that expands and deploys along the windshield and the A pillars and independently of the first deployment part. The second deployment part has an overlap part that overlaps at least a part of the first deployment part. The first inflator supplies gas to the first deployment part and the second inflator supplies gas to the second deployment part.

16 Claims, 8 Drawing Sheets

(56) References Cited

U.S. PATENT DOCUMENTS

2014/0291054 A1* 10/2014 Tanaka .................. B60R 21/36
            180/274
2019/0375366 A1* 12/2019 Kanno ................... B60R 21/36

FOREIGN PATENT DOCUMENTS

| JP | 2001-334895 A | 12/2001 |
| JP | 2003-276537 A | 10/2003 |
| JP | 2006-219116 A | 8/2006 |
| JP | 2014-208513 A | 11/2014 |

OTHER PUBLICATIONS

Innan et al., Fall Preventing Air Bag Device, Jun. 20, 1995, EPO, JP H07-156749 A, Machine Translation of Description (Year: 1995).*

Office Action regarding Japanese Patent Application No. 2022-546261, dated Jul. 27, 2023.

* cited by examiner (a)

(b)

A-A (a)

(b)

B-B (a)

C-C
(b)

(a)

(b)

PEDESTRIAN PROTECTION AIRBAG DEVICE

TECHNICAL FIELD

The present invention relates to a pedestrian protecting airbag device having an airbag cushion that expands and deploys from below a front hood of a vehicle toward a windshield.

BACKGROUND ART

In recent years, pedestrian protecting airbag devices have been developed to protect pedestrians outside a vehicle, as airbag devices that differ from devices that restrain occupants inside the vehicle. Primarily, pedestrian protecting airbag devices are configured to expand and deploy an airbag cushion at a position where there is a possibility that the body of the pedestrian would contact, such as a windshield or the like, when a sensor installed in the front portion of the vehicle detects contact with a pedestrian.

Pedestrian protecting airbag devices are required to quickly cover an area of a vehicle that pedestrians may come into contact with as a protective area. For example, in the protective bag device for pedestrians and the like, disclosed in Patent Document 1, two gas generators 30 are used to deploy the airbag 10 as evenly as possible, and each gas generator 30 is inserted into gas guide members 20, allowing for the gas to be evenly supplied to a wide range of the airbag 10 through the gas guide members 20.

RELATED ART DOCUMENTS

Patent Documents

Patent Document 1: Japanese Unexamined Patent Application Publication No. 2003-276537

SUMMARY OF THE INVENTION

However, objects to be protected by pedestrian protecting airbag devices include not only pedestrians walking but also cyclists riding bicycles. Since cyclists come into contact with vehicles together with their bicycles at a high speed, airbag cushions with a wider range and higher internal pressure than those for pedestrians are required for cyclists. As described above, current pedestrian protecting airbag devices are desired to have a structure capable of more efficiently protecting pedestrians, including cyclists, having different conditions.

Problem to be Solved by the Invention

In light of this manner of problems, an object of the present invention is to provide a pedestrian protecting airbag device capable of more efficiently protecting pedestrians and the like under different conditions.

Means to Solve the Problem

In order to solve the problems as described above, a typical configuration of the pedestrian protecting airbag device according to the present invention includes:

a pedestrian protecting airbag device having an airbag cushion that expands and deploys from below a front hood of a vehicle toward a windshield, and a plurality of inflators that supply gas to the airbag cushion, wherein the airbag cushion includes:

at least a first deployment part that expands and deploys along the bottom portion of a windshield, and a second deployment part provided independently from the first deployment part such that gas does not flow therethrough which expands and deploys over a prescribed area of the windshield and along a pair of A pillars on both sides of the windshield in the vehicle width direction, the second deployment part has an overlap part that overlaps with at least a part of the first deployment part; and the plurality of inflators includes at least a first inflator that supplies gas to the first deployment part and a second inflator that supplies gas to the second deployment part.

In the airbag cushion with the configuration described above, the first deployment part and the second deployment part are expanded and deployed independently of each other. This configuration enables increasing the internal pressures of each of the first deployment part and the second deployment part, and, for example, the expansion and deployment of the first deployment part and the second deployment part can be controlled separately. Therefore, the above configuration enables more efficient protection of pedestrians and the like under different conditions.

The first deployment part may be arranged in the vicinity of the front end inside the second deployment part. As a result, for example, the internal pressure of the first deployment part can be used to quickly lift the front hood, and then the second deployment part can be quickly expanded and deployed to an area that pedestrians can readily come into contact with.

The first deployment part may be expanded and deployed from one side to the other side of the pair of A pillars. The first deployment part of this configuration enables, for example, quickly lifting the front hood and quickly covering areas that pedestrians are likely to come into contact with.

The first deployment part may be provided in a state of being contained in the second deployment part. With this configuration as well, it is possible to achieve an airbag cushion in which the first deployment part and the second deployment part can be expanded and deployed independently of each other.

The first deployment part may be provided in contact with the outer surface of the second deployment part. With this configuration as well, it is possible to achieve an airbag cushion in which the first deployment part and the second deployment part can be expanded and deployed independently of each other.

The overlap part of the second deployment part may be formed of a non-expanding portion. With this configuration as well, it is possible to achieve an airbag cushion in which the first deployment part and the second deployment part can be expanded and deployed independently of each other.

The first deployment part may complete expansion and deployment earlier than the second deployment part. The first deployment part having this configuration also makes it possible, for example, to quickly lift the front hood or quickly cover an area that pedestrians are likely to come into contact with.

The pedestrian protecting airbag device further includes a sensor installed at a prescribed location of the vehicle to detect an impact, and a controller for controlling activation of the first inflator and the second inflator according to the impact detected by the sensor, and the controller may activate only the first inflator when the impact detected by the sensor is less than a prescribed value.

With this configuration, for example, when the impact is weak, it is determined that the object to be protected is a pedestrian, and only the first deployment part is expanded and deployed to provide protection, and when the impact is strong, it is determined that the object to be protected is a cyclist, and the second deployment part is expanded and deployed for protection, allowing for protecting the object to be protected according to the situation.

The above airbag cushion may have one or a plurality of vent holes provided in the first deployment part for discharging gas from the first deployment part. According to this configuration, the first deployment part can be controlled such that the pressure thereof does not become excessive.

The one or a plurality of vent holes may include a vent hole provided at a location on the first deployment part adjacent to the second deployment part to release gas from the first deployment part to the inside of the second deployment part.

According to the above configuration, when the internal pressure of the first deployment part increases, the surplus gas is supplied from the first deployment part to the second deployment part, thereby enabling faster expansion and deployment of the second deployment part.

The one or a plurality of vent holes may include a vent hole for releasing gas from the first deployment part to the outside. With this configuration as well, the first deployment part can be controlled such that the pressure thereof does not become excessive.

The one or a plurality of vent holes may be opened when the internal pressure of the first deployment part reaches or exceeds a prescribed value. For example, it is possible to open the vent hole by connecting a prescribed tether to the vent hole, preventing the vent hole from opening when the tether is pulled, and cutting away the tether when the internal pressure reaches a prescribed value. With this configuration, it is possible to prevent the discharge of gas from the vent hole and rapidly expand the first deployment part, while controlling the first deployment part such that the pressure thereof does not become excessive.

Effect of the Invention

The present invention can provide a pedestrian protecting airbag device which can protect a pedestrian and the like with different conditions more efficiently.

DESCRIPTION OF THE PREFERRED EMBODIMENTS

Preferred Embodiments according to the present invention will hereinafter be described in detail with reference to the attached drawings. Dimensions, materials, other specific numerical values, and the like indicated in the Embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Embodiment 1

Figure 1:
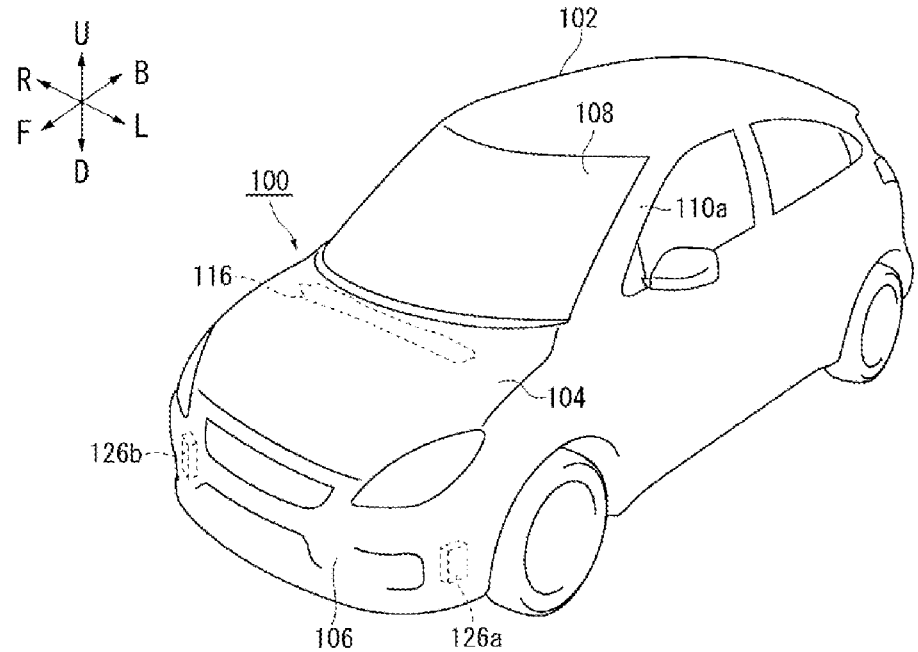
FIG. 1 is a diagram illustrating an outline of the pedestrian protecting airbag device according to Embodiment 1 of the present invention.
Figure 1:
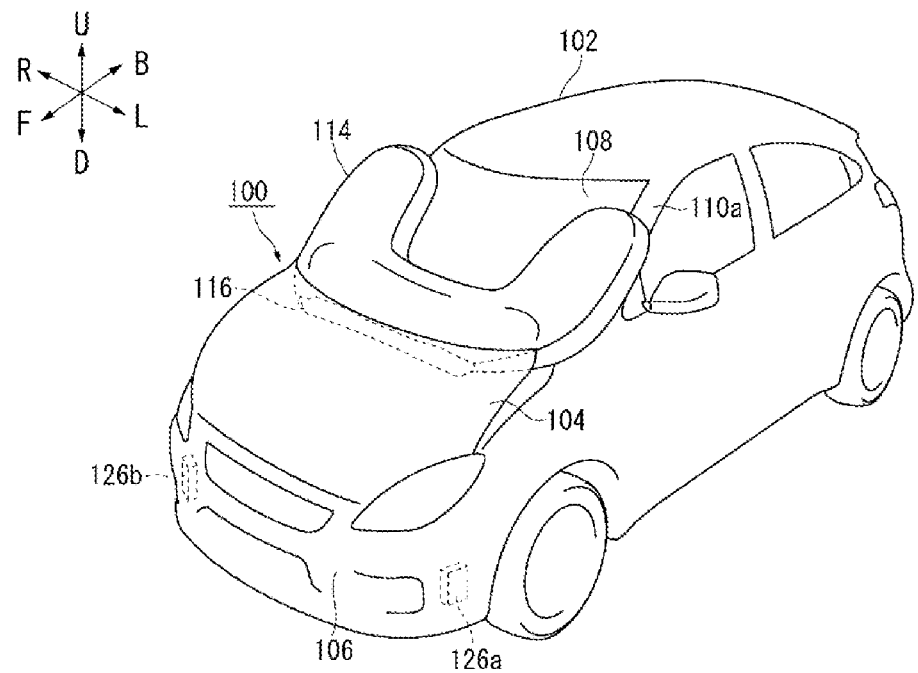

FIG. 1 is a diagram illustrating an outline of a pedestrian protecting airbag device 100 according to Embodiment 1 of the present invention. FIG. 1(a) is a diagram illustrating the vehicle before the pedestrian protecting airbag device 100 is activated. FIG. 1(b) is a diagram illustrating the vehicle when the pedestrian protecting airbag device 100 is activated. Regarding FIG. 1 and other figures, a vehicle front-rear direction is illustrated by the symbols F (Front) and B (Back), a vehicle width direction of the vehicle by the symbols L (Left) and R (Right), and a vehicle up-down direction by the symbols U (Up) and D (Down).

As illustrated in FIG. 1(a), the pedestrian protecting airbag device 100 is installed under the front hood 104 of the vehicle 102. The pedestrian protecting airbag device 100 includes a sensor for detecting an impact at a location, such as the inner portion near the front bumper 106, which is likely to come into contact with the legs of a pedestrian. When the sensor detects contact with a pedestrian, an activation signal is sent to the inflator (first inflator 112a and the second inflator 112b in FIG. 2), which is a gas generator, via the controller. As illustrated in FIG. 1(b), the airbag cushion 114 is expanded and deployed from below the front hood 104 toward the windshield 108.

As illustrated in FIG. 1(a), the pedestrian protecting airbag device 100 includes a housing 116, in which an airbag cushion 114 is stowed. The housing 116 is a long box-like container made mainly of resin, and stows the airbag cushion 114 (see FIG. 2), the inflators (first inflator 112a and second inflator 112b), and the like. The housing 116 is mounted on the underside of the front hood 104 via a special bracket or the like, with the longitudinal direction thereof facing the vehicle width direction.

As illustrated in FIG. 1(b), the airbag cushion 114 in this embodiment expands and deploys along the windshield 108 to stop pedestrians that are about to contact the windshield 108. In addition, the airbag cushion 114 lifts and slightly raises the front hood 104. This action has the effect of softening the impact on pedestrians who come into contact with the front hood 104.

Figure 2:
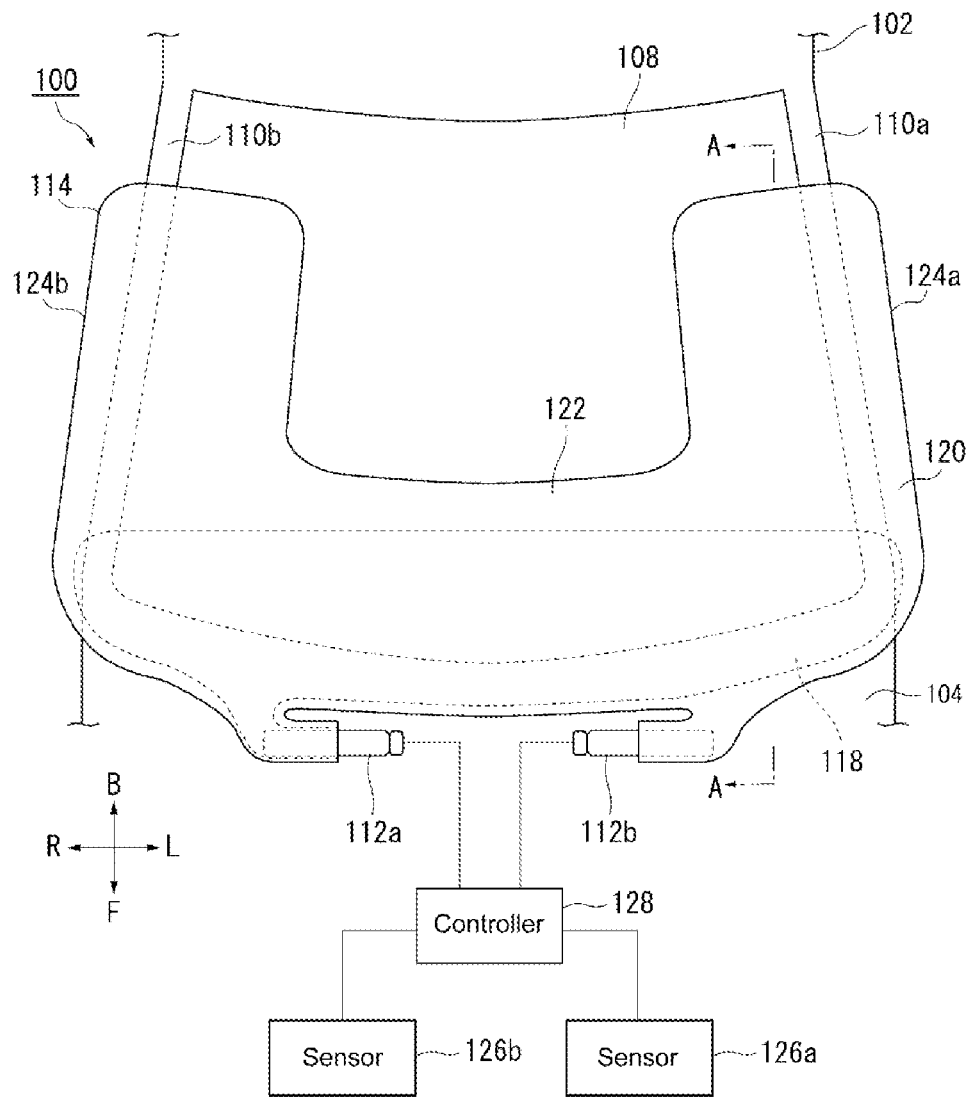
FIG. 2 is a diagram illustrating an example of an enlarged view of the pedestrian protecting airbag device of FIG. 1(a) from above.

FIG. 2 is an example of an enlarged view of the pedestrian protecting airbag device of FIG. 1(a) from above. The airbag cushion 114 is bag shaped and formed by overlapping and sewing; alternatively, multiple base cloths (configuring the surface thereof) are adhered and overlapped or formed by spinning and weaving using an OPW (one-piece woven), or the like.

In the present Embodiment, a plurality of inflators are provided, as the first inflator 112a and the second inflator 112b. These first inflators 112a and the like are arranged on the front end side of the airbag cushion 114 along the vehicle width direction. The first inflator 112a is secured to the inside of the housing 116 using a stud bolt (not shown), and is actuated by an impact detection signal sent from a prescribed sensor so as to supply gas to the airbag cushion 114. The airbag cushion 114 begins to be expanded by the gas from the first inflator 112a and the like, which expands and deploys toward the windshield 108 after the expansion pressure splits the housing 116.

The first inflator 112a and the second inflator 112b are of a cylinder type in the present Embodiment. Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any type of inflator can be used as the first inflator 112a and second inflator 112b.

In the present embodiment, the expansion region of the airbag cushion 114 into which gas flows and expands is divided into a first deployment part 118 and a second deployment part 120. The second deployment part 120 forms the outline of the airbag cushion 114, and the first deployment part 118 is expanded inside the second deployment part 120. In other words, the airbag cushion 114 has a double structure in which the second deployment part 120 includes the first deployment part 118.

The first deployment part 118 receives gas from the first inflator 112a and expands and deploys so as to cover the lower portion of the windshield 108 and the left and right A pillars 110a and 110b in the vehicle width direction, for receiving the body of a pedestrian over a broad area.

The second deployment part 120 is configured independently so that gas for the first deployment part 118 does not flow therethrough. The second deployment part 120 receives gas from the second inflator 112b, and with the first deployment part 118 contained therein, expands and deploys over a prescribed range of the windshield 108 and along the pair of A pillars 110a and 110b on both sides of the windshield 108 in the vehicle width direction.

The second deployment part 120 includes a main expansion region 122 that contains the first deployment part 118 therein and expands and deploys along the windshield 108, and protruding expansion regions 124a and 124b that protrude and expand from both ends of the main expansion region 122 in the vehicle width direction along the A pillars 110a and 110b. Together with the first deployment part 118 therein, the main expansion region 122 receives the body of a pedestrian over a wide surface area. The protruding expansion regions 124a and 124b prevent a head of a pedestrian or the like from contacting the rigid A pillars 110a and 110b.

Figure 3:
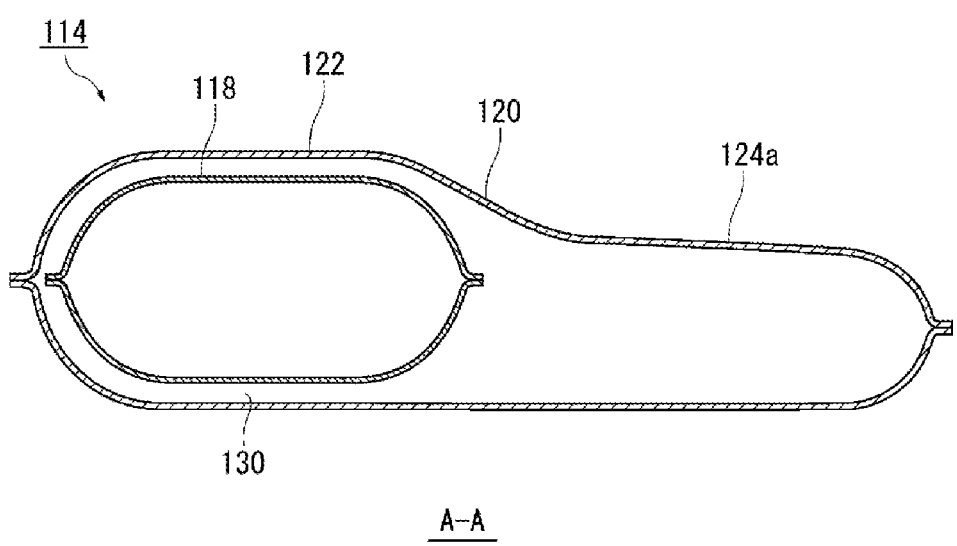
FIG. 3 is a cross-sectional view of the airbag cushion of FIG. 2 taken along line A-A.

FIG. 3 is a cross-sectional view of the airbag cushion 114 of FIG. 2 taken along line A-A. As described above, the airbag cushion 114 of the present Embodiment has a double structure in which the first deployment part 118 is contained in the second deployment part 120. Since the first deployment part 118 and the second deployment part 120 are independently expanded using the first inflator 112a and the second inflator 112b, the internal pressures thereof can be maintained at a higher pressure.

The first deployment part 118 is arranged near the front end inside the second deployment part 120. Further, as described above, the first deployment part 118 has a shape that expands and deploys from the A pillar 110a to the A pillar 110b. As a result, the airbag cushion 114 uses, for example, the internal pressure of the first deployment part 118 to quickly lift the front hood 104, allowing for quick expansion and deployment of the second deployment part 120 to an area that is likely to come into contact with pedestrians.

In addition, the first deployment part 118 has a smaller capacity than the second deployment part 120, and thus is configured to complete expansion and deployment earlier than the second deployment part 120. This configuration also allows the first deployment part 118 to quickly lift the front hood 104 and quickly cover an area that is likely to come in contact with pedestrians.

The second deployment part 120 has an overlap part 130 that overlaps at least a part of the first deployment part 118. In the present Embodiment, the overlap part 130 is formed below the first deployment part 118, and a space is maintained between the overlap part 130 and the first deployment part 118 to form an area in which gas can flow. In some cases, there is no space and the panels of the first deployment part 118 and the second deployment part 120 are in contact with each other.

Refer again to FIG. 2. In the pedestrian protecting airbag device 100, the sensors 126a and 126b and the controller 128 are able to control the operation of the first inflator 112a and the second inflator 112b. For example, the controller 128 can activate only the first inflator 112a when the impact detected by the sensors 126a and 126b is less than a prescribed value.

With the control described above, the controller 128 can determine that, for example, when the impact is weak, the object to be protected is a pedestrian and the vehicle 102 is not moving very fast. In this case, pedestrians are less likely to collide with the windshield 108. Therefore, by expanding and deploying only the first deployment part 118 to lift the front hood 104, the controller 128 has the ability to mitigate the impact when a pedestrian comes into contact with only the front hood 104.

When an impact detected by the sensors 126a and 126b is a strong impact equal to or greater than a prescribed value, the controller 128 can determine that the object to be protected is a cyclist and the vehicle 102 has some speed. In this case, a cyclist or the like may collide with the windshield 108. Therefore, the controller 128 can expand and deploy not only the first deployment part 118 but also the second deployment part 120 to more fully protect the cyclist and the like. At this time, even if the second deployment part 120 were to be damaged by a bicycle collision, since the first deployment part 118 exists independently, protection performance for the cyclist can be maintained. Thus, in the pedestrian protecting airbag device 100, use of the controller 128 enables protecting the object to be protected in accordance with the various situations.

As described above, in the airbag cushion 114 of the present embodiment, the first deployment part 118 and the second deployment part 120 expand and deploy independently of each other. Therefore, for example, by selectively activating the first inflator 112a and the second inflator 112b, the expansion and deployment of the first deployment part 118 and the second deployment part 120 can be separately controlled, allowing for more efficient protection of pedestrians and the like under various conditions.

Embodiment 2

Figure 4:
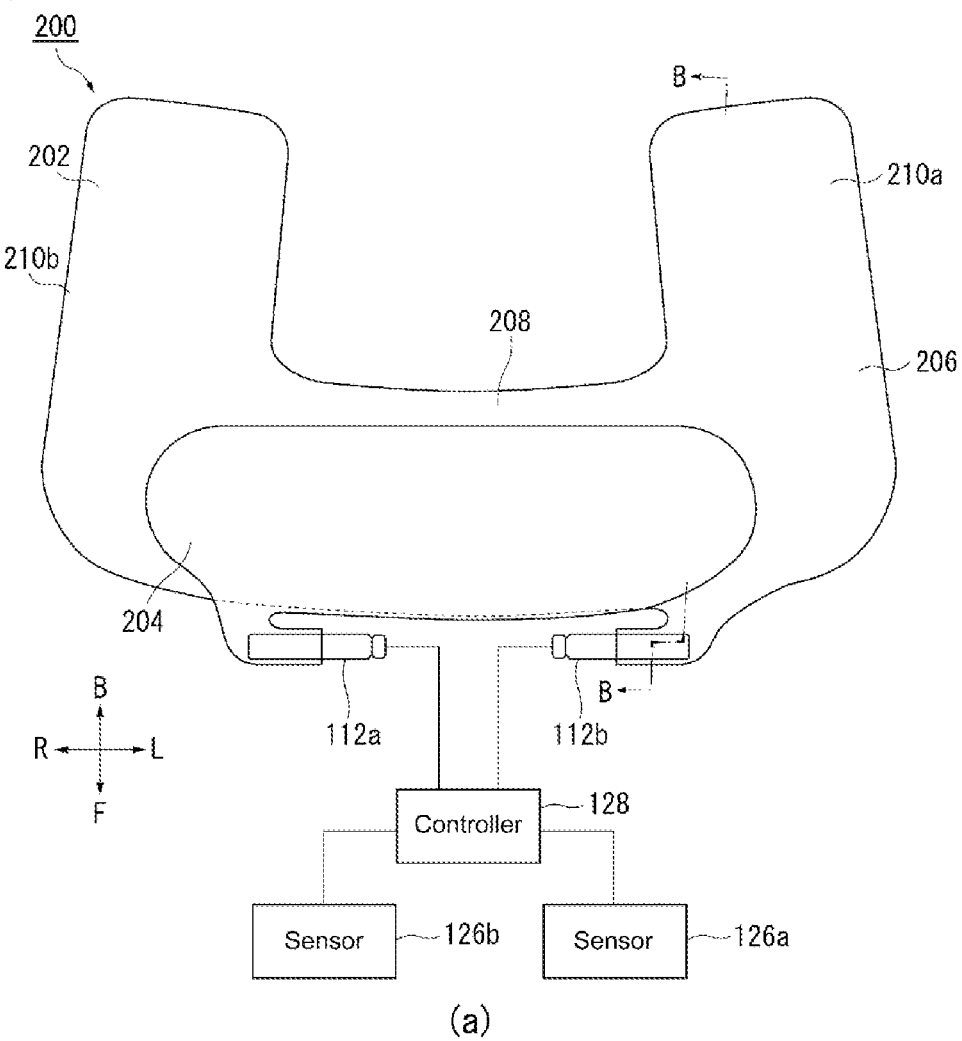
FIG. 4 is a diagram illustrating an outline of the pedestrian protecting airbag device according to Embodiment 2 of the present invention.
Figure 4:
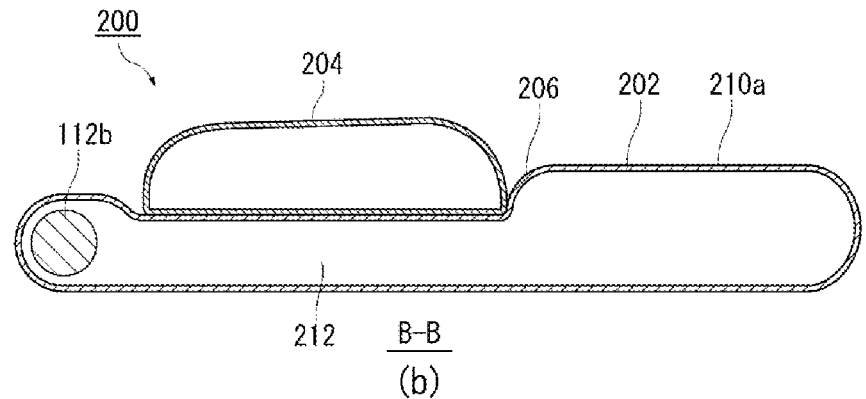

A modified example of the structural element described above according to Embodiment 2 of the present invention will be described below. FIG. 4 is a diagram illustrating an outline of a pedestrian protecting airbag device 200 according to Embodiment 2 of the present invention. In FIG. 4, the same codes are attached to the same structural elements as described above, and a description of the aforementioned structural elements is omitted. In the following description, components having the same name as a component already described are assumed to have the same function unless otherwise specified, even if marked with a different sign.

FIG. 4(a) is a diagram illustrating the pedestrian protecting airbag device 200 from above. In the pedestrian protecting airbag device 200 as well, the expansion region of the airbag cushion 202 into which gas flows and expands is divided into a first deployment part 204 and a second deployment part 206. However, the airbag cushion differs in configuration from the airbag cushion 114 of FIG. 2 in that the first deployment part 204 and the second deployment part 206 are provided adjacent to each other.

The first deployment part 204 receives gas from the first inflator 112a, and expands and deploys so as to cover the lower portion of the windshield 108 from the A pillar 110a to the A pillar 110b in the vehicle width direction, thereby broadening the surface area for receiving a pedestrian.

The second deployment part 206 is provided independently so that gas for the first deployment part 204 does not flow therethrough. The second deployment part 206 receives gas from the second inflator 112b, is adjacent to the first deployment part 204, and independently of the first deployment part 204 expands and deploys over a prescribed area of the windshield 108 and along the pair of A pillars 110a and 110b on both sides of the windshield 108 in the vehicle width direction. The second deployment part 206 includes a connecting region 208 that expands and deploys while being connected to the periphery of the first deployment part 204, and protruding expansion regions 210a and 210b that protrude and expand from both ends of the connecting region 208 in the vehicle width direction along the A pillars 110a and 110b.

FIG. 4(b) is a cross-sectional view of the airbag cushion 202 of FIG. 4(a) along line B-B. For the airbag cushion 202 of the present Embodiment, the first deployment part 204 expands and deploys independently of the second deployment part 206 while in contact with the outer surface of the second deployment part 206. The first deployment part 204 is arranged on the vehicle front side of the second deployment part 206, and the second deployment part 206 expands and deploys on the vehicle rear side of the first deployment part 204 across the A pillars 110a and 110b.

The second deployment part 206 has an overlap part 212 that overlaps at least a part of the first deployment part 204. In the present Embodiment, the overlap part 212 is provided as an area to be expanded and deployed below the first deployment part 204.

The first deployment part 204 is arranged closer to the front side of the vehicle than the second deployment part 206, and is set to have a smaller capacity than the second deployment part 206, so that the first deployment part 204 completes expansion and deployment faster than the second deployment part 206. With these configurations, the first deployment part 204 can quickly lift the front hood 104 and quickly cover areas that are likely to come into contact with pedestrians.

FIG. 4(a) is again referred to. In the pedestrian protecting airbag device 200 as well, the sensors 126a and 126b and the controller 128 can be used to control the operation of the first inflator 112a and the second inflator 112b. The pedestrian protecting airbag device 200 also uses the controller 128 or the like so that, for example, when there is a weak impact, only the first deployment part 204 is expanded and deployed to only lift the front hood 104, and when the impact is strong, the second deployment part 206 is also expanded and deployed to protect a cyclist or the like, enabling protecting the object to be protected according to the situation.

As described above, in the airbag cushion 202 of the present embodiment as well, the first deployment part 204 and the second deployment part 206 are expanded and deployed independently of each other. Therefore, for example, by selectively activating the first inflator 112a and the second inflator 112b, the expansion and deployment of the first deployment part 204 and the second deployment part 206 can be separately controlled, allowing for more efficient protection of pedestrians and the like under various conditions.

Figure 5:
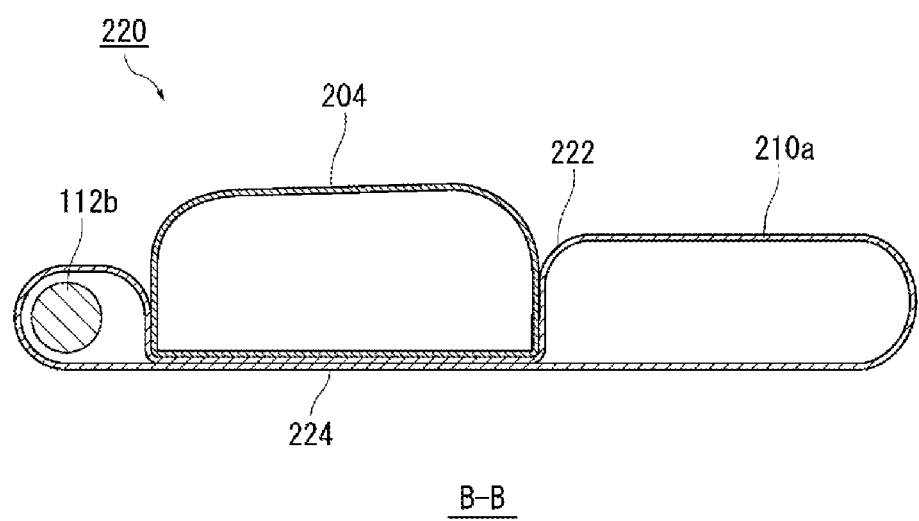
FIG. 5 is a cross-sectional view of the airbag cushion of FIG. 4 taken along line B-B.

FIG. 5 is a diagram illustrating a modified example (airbag cushion 220) of the airbag cushion 202 of FIG. 4(b). The airbag cushion 220 differs from the airbag cushion 202 in that the overlap part 224 of the second deployment part 222 that overlaps at least a part of the first deployment part 204 is formed as a non-inflatable portion. In this configuration, the gas in the second deployment part 222 flows from the inflator 112b to the protruding expansion regions 210a and 210b (see FIG. 4(a)) so as to bypass the first deployment part 204.

With the airbag cushion 220 as well, the first deployment part 204 and the second deployment part 222 are expanded and deployed independently of each other. Therefore, for example, by selectively operating the first inflator 112a and the second inflator 112b (see FIG. 4(a)), the expansion and deployment of the first deployment part 204 and the second deployment part 222 can be separately controlled, allowing for more efficient protection of pedestrians and the like under various conditions.

Figure 6:
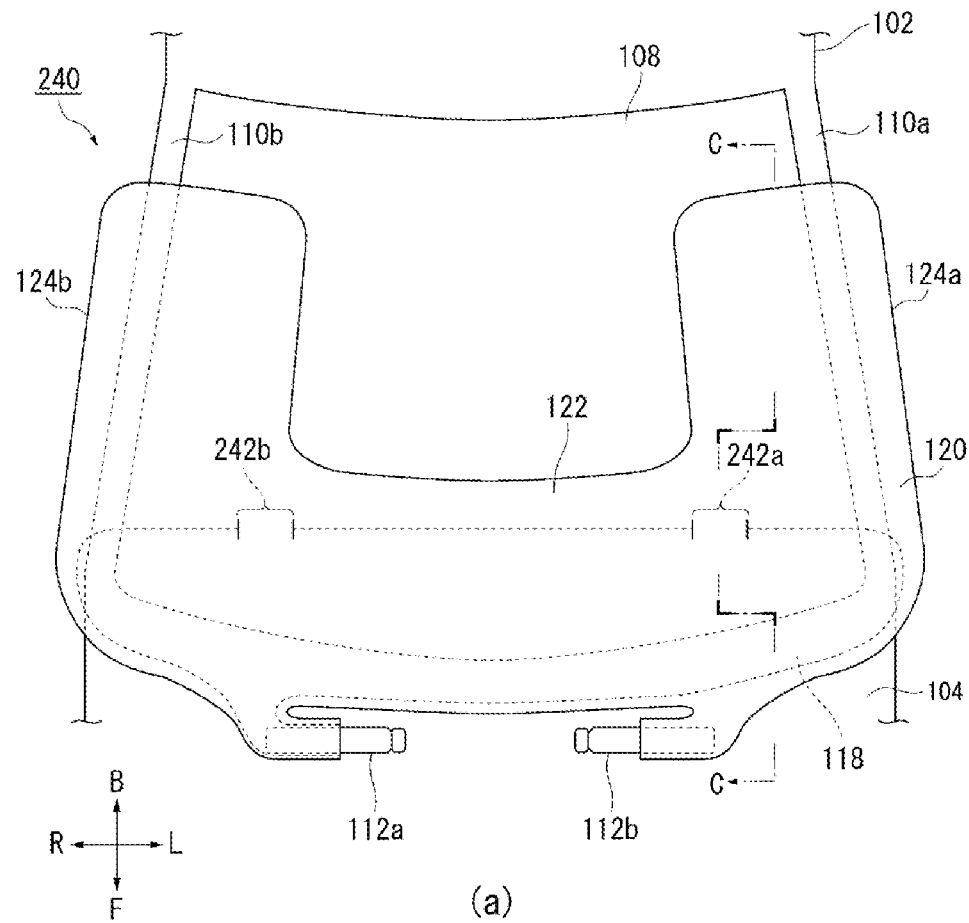
FIG. 6 is a diagram illustrating a modified example of the airbag cushion in FIG. 2.
Figure 6:
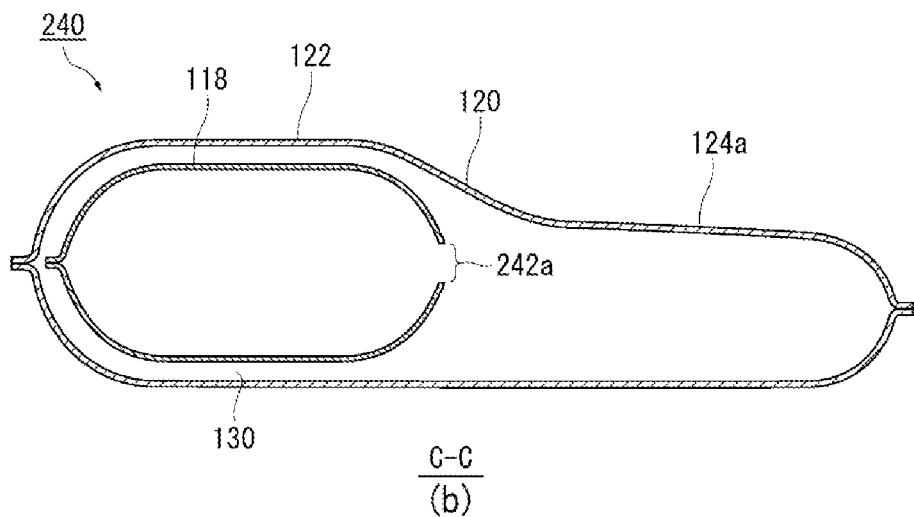

FIG. 6 is a diagram illustrating a modified example (airbag cushion 240) of the airbag cushion 114 in FIG. 2. FIG. 6(a) is a diagram illustrating the airbag cushion 240 according to FIG. 2. The airbag cushion 240 differs in configuration from the airbag cushion 114 of FIG. 2 in having two vent holes 242a and 242b.

The vent holes 242a and 242b are provided at locations adjacent to the second deployment part [no code in original] in the first deployment part 118 and are configured to release gas from the first deployment part 118 to the inside of the second deployment part 120.

FIG. 6(b) is a CC cross-sectional view of the airbag cushion 240 of FIG. 6(a) along the line C-C. The vent hole 242a can be provided, for example, in the first deployment part 118 at a location where gas can be supplied to the protruding expansion region 124a of the second deployment part 120. By providing the vent hole 124a, when the internal pressure of the first deployment part 118 increases, the surplus gas is supplied from the first deployment part 118 toward the protruding expansion region 124a of the second deployment part 120 in particular. With this configuration, it is possible to control the pressure of the first deployment part 118 so as not to increase excessively, and to expedite the expansion and deployment of the second deployment part 120.

Figure 7:
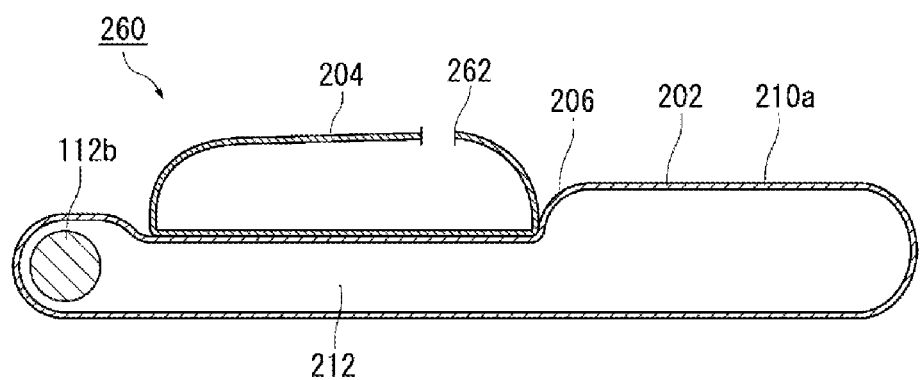
FIG. 7 is a diagram illustrating an example of a modified example of the airbag cushion of FIG. 4(b).

FIG. 7 is a diagram illustrating a modified example (airbag cushion 260) of the airbag cushion 114 of FIG. 4(b). The airbag cushion 260 has a vent hole 262 at a section of the first deployment part 204 that faces the outside. The vent hole 262 can release gas from the first deployment part 204 to the outside enabling controlling of the pressure of the first deployment part 204 so as not to increase excessively.

The number of vent holes 262 provided is not limited, and the number of vent holes 262 can be appropriately set according to the capacity of the first deployment part 204 and the degree of internal pressure.

Figure 8:
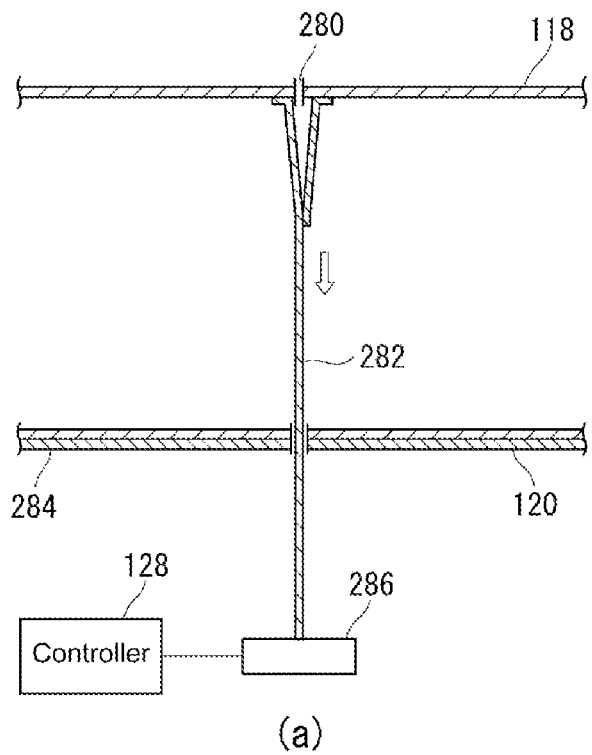
FIG. 8 is a diagram illustrating a modified example of the vent hole of FIG. 6(a).
Figure 8:
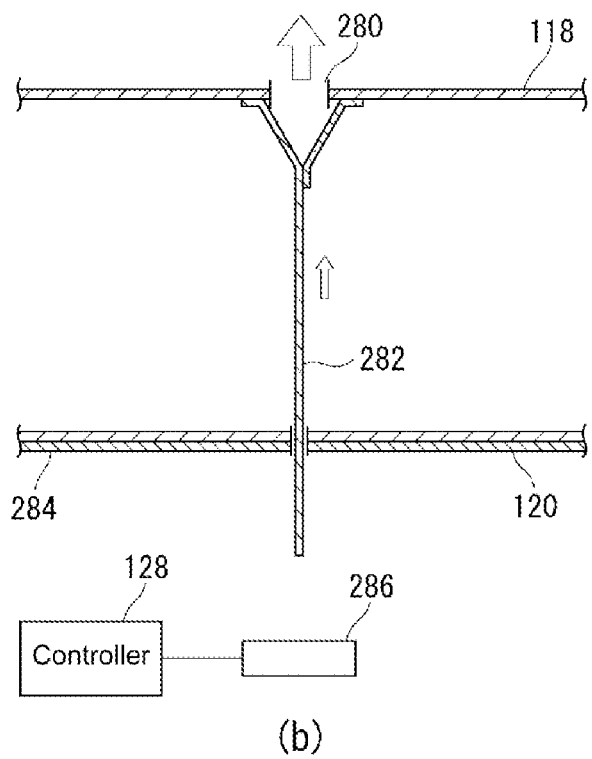

FIG. 8 is a diagram illustrating a modified example (vent hole 280) of the vent hole 242a of FIG. 6(a). FIG. 8(a) is a diagram illustrating the vent hole 280 in a closed state. The vent hole 280 is implemented as a so-called active vent, and has a slit-like opening that is pulled by a tether 282 from the inside of the first deployment part 118 to maintain the closed state.

The tether 282 is connected to the vicinity of both edges of the vent hole 280 at the bifurcated leading side. The base side of the tether 282 is exposed externally from the airbag cushion 284 and connected to a tether cutter 286.

The tether cutter 286 is a device that fastens the tether 282, and when a signal is received from the controller 128, an internal blade moves to cut and drop the tether 282. The tether cutter 286 can be installed on the vehicle along with an inflator or the like.

FIG. 8(b) is a diagram illustrating the vent hole 280 in an open state. The vent hole 280 is configured to be opened by the tether 282 being cut off by the tether cutter 286 when the internal pressure of the first deployment part 118 reaches or exceeds a prescribed value. For example, the internal pressure of the first deployment part 118 may be calculated by the controller 128 based on the time from the start of operation of the first inflator 112a (see FIG. 6(a)), or a prescribed sensor may be provided inside the first deployment part 118 for actual measurement. With the vent hole 280 having this configuration, it is possible to efficiently control the pressure in the first deployment part 118 so as not to increase excessively.

The destination of the gas released from the vent hole 280 is the inside of the second deployment part 120 adjacent to the first deployment part 118 similar to the vent hole 242a in FIG. 6(b), or perhaps to the outside of the airbag cushion 284 similar to the vent hole 262 in FIG. 7. In addition, when a plurality of vent holes 280 are provided, it is possible to provide both a vent hole for releasing gas into the second deployment part 120 and a vent hole for releasing gas to the outside of the airbag cushion 284.

An airbag cushion 284 having the vent hole 280 can function as an alternative or supplement to a piston hood lifter. A piston hood lifter is a mechanism that lifts the front hood 104 (see FIG. 1(a)) in an emergency to soften the impact on the contacting object.

The first deployment part 118 has a function of lifting the front hood 104 from below, as illustrated in FIG. 1(b). By providing the vent holes 280, the first deployment part 118 can first expand rapidly while suppressing the discharge of gas to lift the front hood 104, and when the internal pressure reaches or exceeds a prescribed value, can supply the gas to the second deployment part 120 forming a wide area to restrain or prevent breakage by exhausting gas to the outside, suitably achieving the functions of a piston hood lifter.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person with ordinary skill in the art can conceive various changed examples or modified examples within the scope described in the scope of the claims, which are understood to naturally belong to the technical scope of the present invention.

INDUSTRIAL APPLICABILITY

The present invention can be used as a pedestrian protecting airbag device having an airbag cushion that expands and deploys from below a front hood of a vehicle toward a windshield, and an inflator that supplies gas to the airbag cushion.

EXPLANATION OF CODES

100. Pedestrian protecting airbag device of Embodiment 1; 102. Vehicle; 104. Front hood; 106. Front bumper; 108. Windshield; 110a, 110b. A pillar; 112a. First inflator; 112b. Second inflator; 114. Airbag cushion; 116. Housing; 118. First deployment part; 120. Second deployment part; 122. Main expansion region; 124a, 124b. Protruding expansion region; 126a, 126b. Sensor; 128. Controller; 130. Overlap part; 200. Pedestrian protecting airbag device of Embodiment 2; 202. Airbag cushion; 204. First deployment part; 206. Second deployment part; 208. Connecting region; 210a, 210b. Protruding expansion region; 212. Overlap part; 220. Airbag cushion of the modified example; 222. Second deployment part; 224. Overlap part; 240. Airbag cushion; 242a, 242b. Vent hole; 260. Airbag cushion; 262. Vent hole; 280. Vent hole; 282. Tether; 284. Airbag cushion; 286. Tether cutter.

The invention claimed is:

1. A pedestrian protecting airbag device comprising:
   an airbag cushion configured expand and deploy from below a front hood of a vehicle toward a windshield; and
   a plurality of inflators that supply gas to the airbag cushion,
   wherein the airbag cushion includes:
   at least a first deployment part for expansion and deployment along the bottom portion of a windshield, and
   a second deployment part provided independently from the first deployment part such that gas does not flow therethrough for expansion and deployment over a prescribed area of the windshield and along a pair of A pillars on both sides of the windshield in the vehicle width direction;
   the second deployment part has an overlap part that overlaps with at least a part of the first deployment part; and
   the plurality of inflators includes at least a first inflator that supplies gas to the first deployment part and a second inflator that supplies gas to the second deployment part,
   wherein the first deployment part is separated from the second deployment part such that inflation gases do not flow therebetween, and
   wherein the first deployment part is expanded inside the second deployment part.

2. The pedestrian protecting airbag device according to claim 1, wherein the first deployment part is arranged near the front end inside the second deployment part.

3. The pedestrian protecting airbag device according to claim 1, wherein the first deployment part expands and deploys from one side to the other side of the pair of A pillars.

4. The pedestrian protecting airbag device according to claim 1, wherein the first deployment part is provided in a state contained within the second deployment part.

5. The pedestrian protecting airbag device according to claim 1, wherein the first deployment part is provided in contact with the top of the outer surface of the second deployment part.

6. The pedestrian protecting airbag device according to claim 5, wherein the overlap part of the second deployment part is formed of a non-expanding part.

7. The pedestrian protecting airbag device according to claim 1, wherein the first deployment part completes expansion and deployment faster than the second deployment part.

8. The pedestrian protecting airbag device according to claim 1, further comprising:
- a sensor installed at a prescribed location of the vehicle to detect an impact, and
- a controller that controls activation of the first inflator and second inflator according to the impact detected by the sensor, wherein
- the controller activates only the first inflator when the impact detected by the sensor is less than a prescribed value.

9. The pedestrian protecting airbag device according to claim 1, wherein the airbag cushion has one or a plurality of vent holes provided in the first deployment part for discharging gas from the first deployment part.

10. The pedestrian protecting airbag device according to claim 9 wherein the one or a plurality of vent holes include vent holes provided on a location of the first deployment part adjacent to the second deployment part to release gas from the first deployment part to the inside of the second deployment part.

11. The pedestrian protecting airbag device according to claim 9, wherein the one or a plurality of vent holes include vent holes for releasing gas from the first deployment part to the outside.

12. The pedestrian protecting airbag device according to claim 9, wherein the one or a plurality of vent holes open when the internal pressure of the first deployment part reaches or exceeds a prescribed value.

13. The pedestrian protecting airbag device according to claim 1, wherein the second deployment part forms an outline of the airbag cushion.

14. The pedestrian protecting airbag device according to claim 1, wherein the airbag cushion has a double structure in which the second deployment part internally includes the first deployment part.

15. The pedestrian protecting airbag device according to claim 1, wherein the first deployment part receives gas from a first inflator of the plurality of inflators and the second deployment part receives gas from a second inflator of the plurality of inflators.

16. The pedestrian protecting airbag device according to claim 1, wherein the second deployment part includes a main expansion region that contains the first deployment part therein and further includes first and second expansion regions on first and second lateral sides, respectively, of the main expansion region.

* * * * *